Patented Apr. 27, 1948

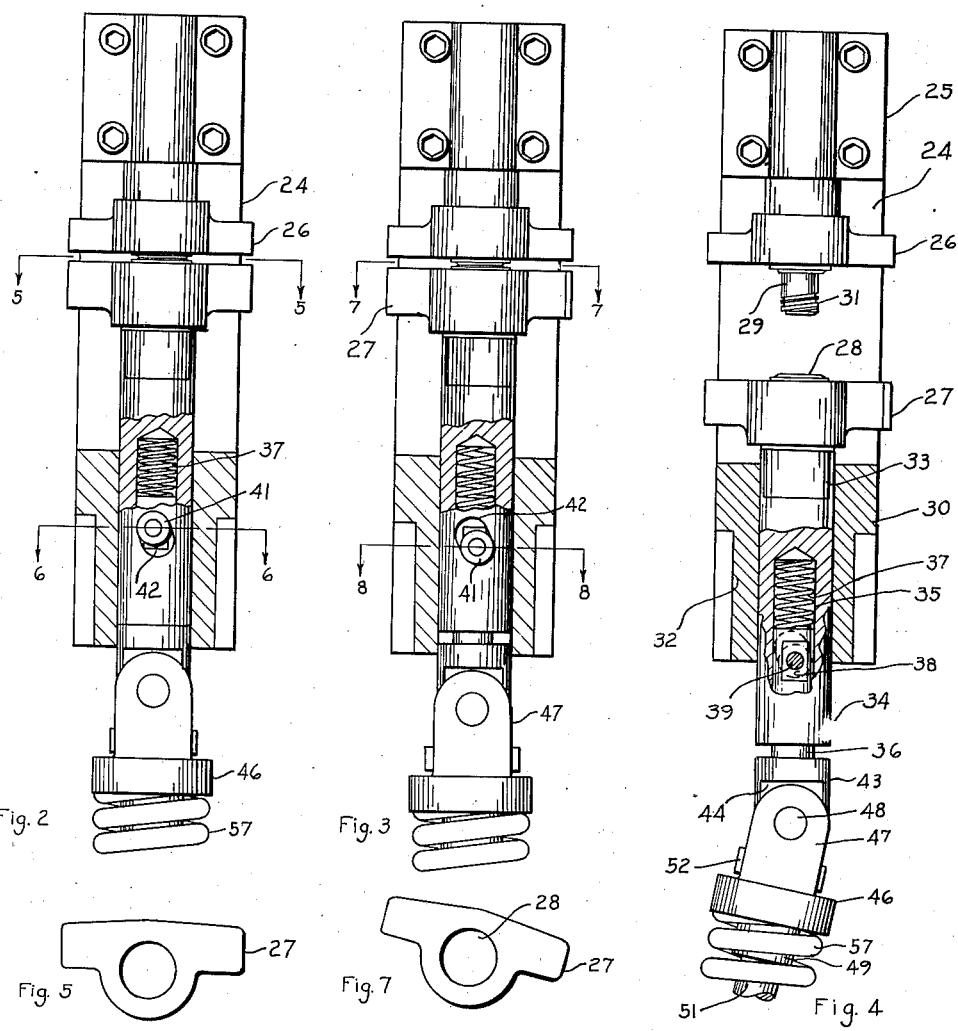

2,440,367

UNITED STATES PATENT OFFICE 2,440,367

MOLDING MACHINE

David Cropp, Rochester, N. Y., assignor to Cropp Engineering Corporation, Warren, Pa., a corporation of Delaware Application July 24, 1945, Serial No. 606,826

5 Claims. (Cl. 18—20)

This invention relates to improvements in a machine for compression molding articles from plastic materials, and particularly to a machine of the turret type adapted for automatic sequential operation.

In the molding of large quantities of small plastic articles, it is necessary, at least from the standpoint of cost, to provide all possible means by which to render a molding machine entirely automatic in its operation. It is, of course, necessary to provide means for automatically filling the cavity of a mold, and for closing and opening the mold elements periodically as required. There are, of course, many small molded articles which present no problem in their removal from these mold cavities. However, there are other types of small articles which, being formed with slight undercuts, threads, etc., present a rather serious problem of removal from a mold. It is with this latter type of molded articles that the present invention is more particularly concerned.

For purposes of illustration, the present invention is shown as constituting part of an automatic, sequentially operated, turret type machine for the compression molding of internally threaded bottle caps, the machine being substantially of the type shown and described in my co-pending application, Serial No. 604,762, filed July 13, 1945.

In the automatic sequential molding of articles of this type some means is required to loosen each molded piece, preparatory to the removal of the piece from the cavity in which it has been molded. The tendency of the molded piece to adhere to the mold force or cavity walls is perhaps greater, and certainly more troublesome to overcome in the case of articles having ribs, projections, or threads. To illustrate, an internally threaded bottle cap may not merely be pried loose or removed by some conventional mechanism, but must first be freed of its tendency to adhere to the force, and subsequently unscrewed from the threads of the force. In the present invention, mechanism is provided for this purpose, and it is therefore a purpose and object of the invention to provide means by which small molded articles may be removed from each mold of an automatic sequential molding machine. It is also an object of the invention to provide means for loosening a molded article from the mold element on, or in which it has been formed. Additionally, it is an object of the invention to provide means for breaking the seal or adherence of a molded article to its mold element prior to the separation of the elements of the mold, which separation is, of course, preparatory to removal of the article.

Other objects and advantages will be more fully understood from a consideration of the following specification, taken in conjunction with the accompanying drawings; and in which Fig. 1 is a fragmentary front elevational view of an automatic sequential turret type molding machine embodying one form of the invention, and for purposes of illustration shows several of the molding units in various opened or closed positions;

Fig. 2 is an enlarged fragmentary front elevational view of one of the several molding units shown in Fig. 1, the elements of the mold being in fully closed position, and parts being broken away to show certain structural details;

Fig. 3 is a fragmentary front elevational view of the molding unit shown in Fig. 2, certain parts having been relatively adjusted preparatory to separation of the mold elements;

Fig. 4 is a fragmentary front elevational view of the structure of Fig. 2 with the elements of the mold fully separated, additional parts being broken away to show their structural details;

Figure 1:
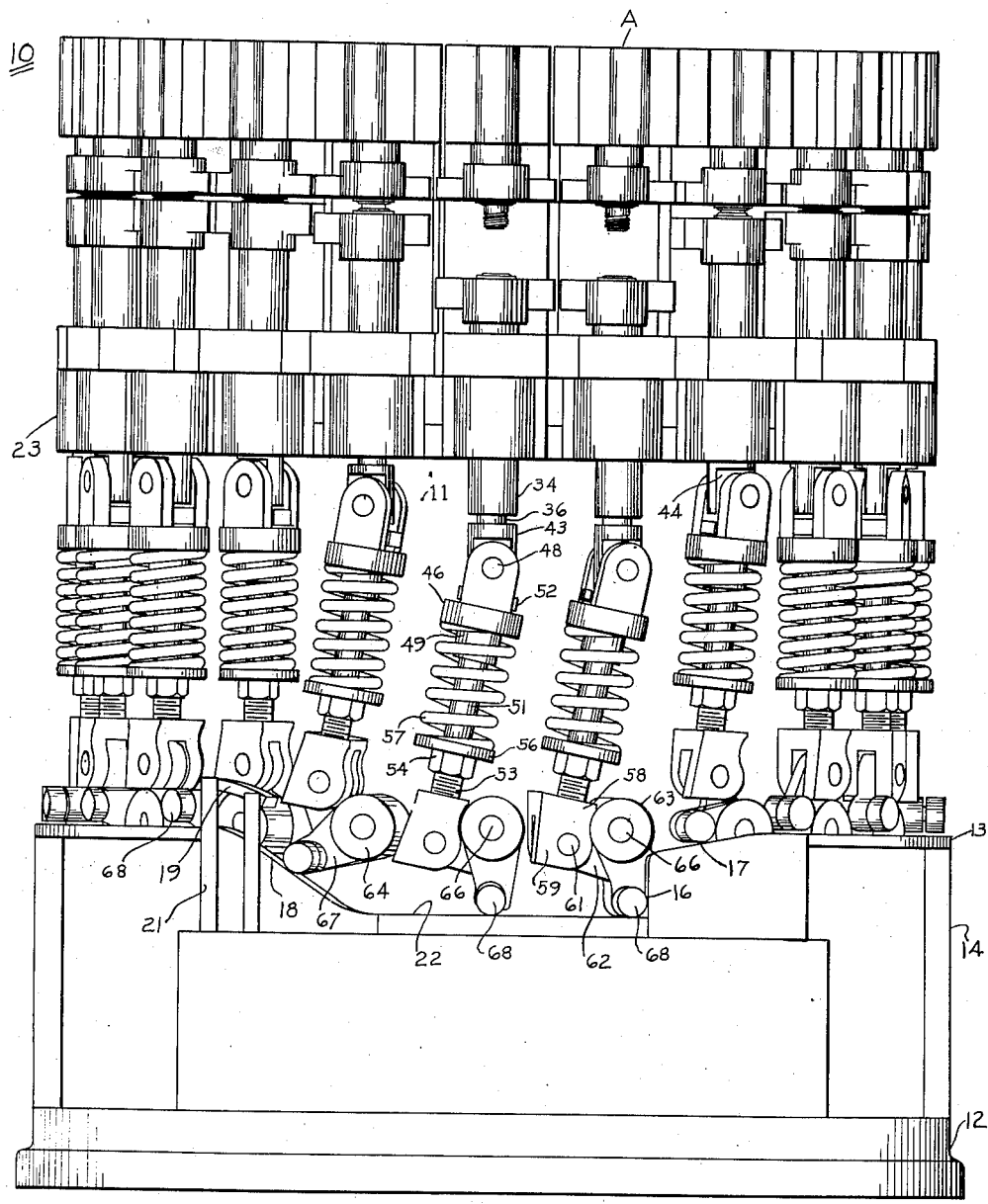

Figs. 5 and 6 are horizontal sectional views taken on the lines 5—5 and 6—6 of Fig. 2; and Figs. 7 and 8 are horizontal sectional views taken on the lines 7—7 and 8—8 of Fig. 3.

Referring more particularly to Fig. 1 of the drawings, the reference numeral 10 is employed to generally designate one form of a turret type press with which the present embodiment of the invention is associated. This press comprises two parts, namely a turret 11 and a base 12. The turret 11 is preferably mounted in any well known manner on a central support carried by the base 12, and suitable mechanism is provided for the purpose of rotating the turret at any desired speed. For purposes of the present invention, it may be assumed that the means employed to rotate the turret is set to operate at a speed consistent with a molding cycle for molding pieces of the nature herein set out.

The base 12 includes a circumferential track 13 which, in the present showing, is supported on the pedestal portion of the base by uprights 14. This track is in a horizontal plane throughout a substantial portion of its length, the only break being at the front of the machine, as shown in Fig. 1 of the drawings. For a clearer understanding of this structure, the molding cycle is indicated as commencing with the vertical portion 16 and inclined portion 17 of the track 13. On the completion of the molding cycle, the track 13 inclines downwardly, as indicated at 18, and through a part of the length of this incline an upper guard 19 is provided, being supported in any suitable manner, as by parts 21. Between the end of the incline 18 and the vertical portion 16, the track continues along a horizontal plane 22, substantially as shown. The portion 22 of the track represents a time period between the end of a cycle and the beginning of another cycle and is sufficient to permit ejecting a molded piece and refilling the mold cavity preparatory to molding another piece.

In the upper portion 23 of the turret there is located a plurality of radially disposed brackets or mold element supports 24 which include upper and lower offset portions 25 and 30, adapted to mount the upper element 26 and lower element 27 of a complete mold. Sufficient space is provided for movement of one of the mold elements into an opened position such that a finished article may be removed. The lower mold element 27, in the present showing of the invention, includes a mold cavity 28, whereas the element 26 is formed with a force 29 on which threads 31 are formed. It will be understood that the element 26, once secured, remains stationary, whereas the element 27 is intended to be movable into an opened or closed position, such as shown by comparison of Figs. 2 and 4 of the drawings.

The offset 30 of each support 24 includes a depending sleeve 32. A shaft 33, extending downwardly from the element 27, projects through this offset and sleeve. The lower end 34 of this shaft, in the position shown in Fig. 4, extends beyond the end of the sleeve 32. This end of the shaft is formed with a cylindrical opening 35, into which a rod 36 is adapted to project. The rod 36 does not extend the full depth of the opening 35, and thus space is provided for a coiled spring 37. Adjacent one end the rod 36 is formed with diametrically opposite flat surfaces 38, and a transverse opening therethrough accommodates a pin 39. The ends of this pin extend sufficiently beyond the surfaces 38 to mount rollers 41. These rollers are located in inclined slots 42, formed in that portion of shaft 33 in which the opening 35 is made. The slots 42 of any given shaft are reversely inclined and, consequently, any lengthwise movement as between shaft 33 and rod 36 produces relative rotation to an extent determined by the length and incline of the slots 42 in which the rollers 41 are movable.

Joined to, or formed integral with the lower end of the rod 36 is a portion 43, having a transversely apertured end 44. A yoke 46 is pivotally joined along its arms 47 to the end 43 of the rod by a pin 48. The base of the yoke includes a downwardly extending collar 49. A suitable opening is made through the yoke in which to receive a rod 51. The upper end of this latter rod is formed with a head 52 that is located between the arms 47, the head being of sufficient size to prevent displacement of the rod 51. Adjacent its other end, rod 51 is formed with a threaded portion 53. A nut 54, engaged with the threaded portion 53, adjustably supports a washer-like plate 56. This plate in turn provides a seat for one end of a coiled spring 57 that encircles the rod 51 and has its other end engaged with the under edge of the yoke 46 and surrounds collar 49. Tension of spring 57 may be varied as required by adjustment of the nut 54 over the extensive threaded portion 53. Sufficient space is, of course, provided between the upper surface of the rod head 52 and the lower edge of the end 44 to assure full use of the spring as the force by which to close the mold elements and hold them in closed position under predetermined pressure during a molding cycle.

Adjacent the threaded portion 53, the rod 51 projects into the base portion of a downwardly opening yoke 58. Yoke and rod are held against relative movement in any suitable manner, as through the use of a drive pin (not shown). The arms 59 of the yoke 58 are apertured to mount a pin 61. This pin pivotally mounts an extension 62 of a member 63. The cylindrical portion 64 of this member has a transverse opening which receives one end of a pin 66. This pin is of substantial proportions and is carried by the turret 11. Extending from the portion 64 is an arm 67 on the end of which is mounted a roller 68. This roller is adapted to contact the track 13 and guard 19.

For a clearer understanding of the invention, a complete cycle of operation of the mechanism of the invention is set out as follows: As shown in Fig. 1 of the drawings, the molding units, having their rollers 68 in contact with the portion 22 of the track, are in fully opened position, this position corresponding to the enlarged sectional view of Fig. 4. It will be noted that the molding elements 26 and 27 are in fully opened position, rod 51 is inclined to the direction of travel of shaft 33, and rollers 41 are at the bottom of the slots 42, the element 27 being turned as shown in Figs. 3 and 7. The molding unit, designated in Fig. 1 as A, has received a powder or pellet charge in the cavity 28 and, as the turret rotates, contact of roller 68 of this unit with the vertical portion 16 of the track causes rotation of the member 63 and upward movement of rod 51, shaft 33, and element 27. As upward movement of these parts continues, spring 37 compresses to an extent to allow movement of the rollers 41 to the upper ends of slots 42, this travel of the rollers being translated into slight rotary movement of the element 27 from the position shown in Fig. 7 to that of Fig. 5. When the roller 68 has moved onto the inclined portion 17 of the track, the parts are in the position shown in Fig. 2. Movement of the roller 68 along the uppermost portion of incline 17 actuates parts 58 and 63 in a manner to cause spring 57 to constitute an active force by which to hold the mold elements 26 and 27 in proper position throughout a molding operation.

As heretofore brought out, difficulty is invariably experienced in loosening a newly molded article from either or both elements of a mold, this being particularly a problem in the molding of internally threaded caps. Thus it is first necessary to break loose the cap from its adherence to the threaded force on which it has been formed. Continuing with the molding sequence, as the turret 11 continues to revolve, the molding units successively reach a point where the roller 68 of each member 63 comes into contact with the guard 19. This contact with the guard causes the member 63 to commence rotating about its pivot 66, past dead center, and spring 57 may now act as a force to separate the mold elements. However, since there is a yieldable connection between rod 36 and shaft 33 of element 27, initial release of the spring 57, by rotation of member 63 past dead center, does not first effect separation of the mold elements but, rather, allows lengthwise movement as between rod 36 and shaft 33. This movement is in a direction such that rollers 41, under the expanding action of spring 37, travel to the lower ends of slots 42, thus slightly rotating element 27; that is, from the position of Fig. 5 to that of Fig. 7. This clockwise rotation, while the elements 26 and 27 are still in abutment, causes the mold piece within the cavity 28 to rotate slightly about the threads 31 of the force 29, thus loosening the article on the force. At this point the roller 68 rapidly moves down the inclined surface 18 of the track, further rotating member 63 and allowing spring 57 to fully separate the mold elements. Inasmuch as the mold elements are now separated, the molded article exposed to view and only loosely carried by the force 29, any suitable means, such as a revolving wheel, may be moved into engagement with the article to completely unthread it from the force.

Although applicant has shown and described only one form of his invention in connection with loosening molded articles preparatory to their removal from one or another of the mold elements, it will be understood that variations or modifications of the structure herein shown and described may be made and are contemplated insofar as they are within the spirit and scope of the invention as embodied in the annexed claims.

Having thus set forth my invention, what I claim as new and for which I desire protection by Letters Patent is:

1. In a molding machine having a rotatable turret, a plurality of molds carried by said turret, each of said molds comprising a fixed element and a cooperative movable element, a track on a stationary part of said machine, means for moving said movable element, said means being carried by said turret and rendered movable by engagement with at least a portion of said track, lost motion means connecting the movable element with said moving means, said lost motion means including two relatively movable parts constructed to turn said movable element about an axis common to both elements during relative movement of said last named parts.

2. In a molding machine, a mold comprising a pair of cooperative elements, one of said elements being fixed and the other movable, operable means for effecting movement of the movable element toward or away from the fixed element to effect closing and opening said mold, a lost motion connector between the movable element and said operable means, said connector including cooperative parts adapted to have such relative movement, during movement of said movable element, as to turn said movable element about an axis common to both elements.

3. In a molding machine having a rotatable turret, a plurality of molds carried by said turret, each of said molds comprising a fixed element and a cooperative movable element, a track on a stationary part of said machine, means for moving said movable element, said means being carried by said turret and rendered movable by engagement with at least a portion of said track, lost motion means connecting the movable element with said moving means, said lost motion means including parts so constructed and organized as to have relative movement to turn said movable element about an axis common to both elements during initial movement of said lost motion means and prior to relative movement of said elements.

4. In a molding machine, a mold comprising a pair of cooperative mold elements relatively movable in the direction of their common axis into opened or closed position, operable means for effecting movement of said elements into colsed position, lost motion means associating at least one of the elements with said operable means, said lost motion means including relatively movable parts so constructed that, upon final movement of said operable means, to close said mold, said elements will relatively rotate about their common axis during relative movement of said movable parts.

5. In a molding machine, a mold comprising a pair of cooperative elements, operable means for moving one of said elements toward or away from the other of said elements to effect closing and opening said mold, lost motion means connecting the movable element with said operable means, said lost motion means including cooperative parts constructed to have such relative movement as to rotate the movable element about a center common to both elements during initial movement of said operable means in a direction to open said mold and, during final movement of said operable means, in a direction to close said mold.

DAVID CROPP.

REFERENCES CITED

The following references are of record in the file of this patent:

UNITED STATES PATENTS

| Number | Name | Date |
|---|---|---|
| 1,959,612 | Burke | May 22, 1934 |
| 2,238,198 | Weber | Apr. 15, 1941 |
| 2,295,220 | Kaula | Sept. 8, 1942 |
| 2,306,205 | Crosman, Jr. | Dec. 22, 1942 |
| 2,317,823 | Strauss | Apr. 27, 1943 |